US007170998B2

(12) United States Patent
McLintock et al.

(10) Patent No.: US 7,170,998 B2
(45) Date of Patent: Jan. 30, 2007

(54) DOOR ACCESS CONTROL AND KEY MANAGEMENT SYSTEM AND THE METHOD THEREOF

(75) Inventors: Gavin A. McLintock, Gloucester (CA); Michael D. Caughey, Arnprior (CA)

(73) Assignee: LochIsle Inc., Gloucester (CA)

( * ) Notice: Subject to any disclaimer, the term of this patent is extended or adjusted under 35 U.S.C. 154(b) by 790 days.

(21) Appl. No.: 10/004,340

(22) Filed: Oct. 25, 2001

(65) Prior Publication Data

US 2002/0099945 A1 Jul. 25, 2002

(30) Foreign Application Priority Data

Oct. 26, 2000 (CA) .................................... 2324679

(51) Int. Cl.
*H04L 9/14* (2006.01)

(52) U.S. Cl. ...................................... 380/277; 340/5.23

(58) Field of Classification Search ................ 380/277; 713/182, 185; 709/201; 340/5.23, 5.25, 340/5.7

See application file for complete search history.

(56) References Cited

U.S. PATENT DOCUMENTS

| | | | | |
|---|---|---|---|---|
| 4,760,393 | A | 7/1988 | Mauch | |
| 5,337,043 | A | 8/1994 | Gokcebay | |
| 5,513,244 | A * | 4/1996 | Joao et al. | 455/404.1 |
| 5,541,583 | A | 7/1996 | Mandelbaum | |
| 5,541,585 | A * | 7/1996 | Duhame et al. | 340/5.62 |
| 5,614,703 | A | 3/1997 | Martin et al. | |
| 5,774,059 | A * | 6/1998 | Henry et al. | 340/5.54 |
| 5,790,977 | A | 8/1998 | Ezekiel | |
| 5,850,753 | A * | 12/1998 | Varma | 70/278.7 |
| 5,897,884 | A * | 4/1999 | Calabria et al. | 425/116 |
| 5,898,230 | A | 4/1999 | Bartel et al. | |
| 5,979,754 | A * | 11/1999 | Martin et al. | 235/382 |
| 5,983,218 | A * | 11/1999 | Syeda-Mahmood | 707/3 |
| 6,006,258 | A * | 12/1999 | Kalajan | 709/219 |
| 6,049,287 | A * | 4/2000 | Yulkowski | 340/693.12 |
| 6,064,316 | A | 5/2000 | Glick et al. | |
| 6,130,606 | A * | 10/2000 | Flick | 340/426.14 |
| 6,269,365 | B1 * | 7/2001 | Kiyoki et al. | 707/6 |
| 6,549,130 | B1 * | 4/2003 | Joao | 307/10.2 |

FOREIGN PATENT DOCUMENTS

| | | |
|---|---|---|
| DE | 196 21 909 | 12/1997 |
| EP | 0 716 399 | 6/1996 |
| EP | 1 024 239 | 8/2000 |
| GB | 2 344 670 | 6/2000 |
| WO | WO 98/12650 | 3/1998 |

* cited by examiner

*Primary Examiner*—Gilberto Barrón, Jr.
*Assistant Examiner*—Lan-Dai Thi Truong
(74) *Attorney, Agent, or Firm*—Pearne & Gordon LLP

(57) ABSTRACT

A door access control and key management system is disclosed, in which a number of doors and door users are involved. The system comprises a door/key administering system and a door lock/control assembly mounted on each door, which are communicatively interconnected with each other via a communications network. The door/key administering system serves to store a key unique to each of the users, store an identification code unique to each of the doors, and assign access authorization to at least one user for each door. The door lock/control assembly serves to read the key presented by the user, verify that the key has access authorization, and operate the door in response to the authorization for access. Each user can gain access to the doors authorized to the user with a unique key and each door can provide access to the user or users assigned thereto.

45 Claims, 3 Drawing Sheets

DOOR ACCESS CONTROL AND KEY MANAGEMENT SYSTEM AND THE METHOD THEREOF

FIELD OF THE INVENTION

The invention relates generally to a security system and particularly to a system and method for controlling physical access to doors and managing keys via a communication network.

BACKGROUND OF THE INVENTION

Virtually all private residences, businesses and governments employ locks on all exterior doors and many interior doors to control physical access to premises and vehicles, and to protect valuable contents and occupants from outsiders. The technology of locks and related security products have developed to provide a very wide range of choices in security levels, locking mechanisms, key types and other features. Available "key" technologies include, among others, various kinds of mechanical keys, magnetically coded swipe cards, so-called "smart" cards with embedded microelectronic devices, plastic or metal cards coded with mechanical holes, short range radio frequency (RF) or infrared (IR) transmitters with coded signals, and various keypad arrangements requiring the user to input a predetermined unlocking code.

Presently, keys are generally associated with one or a few doors, and therefore, access to the keys, i.e., the use of the doors, is controlled by the owner of the premises or vehicle to which the door allows access. The current system of lock usage leads to a number of problems both for the owners of premises and vehicles with lockable doors and for individual users. Most individual users are forced to carry and manage a large number of mechanical keys anchor cards. Also, it is an issue to remember a number of passwords or keypad numbers and which key fits which lock, especially for keys which are used infrequently. Lost keys may result, in the case of mechanical keys, in a need to replace or re-key all locks with which the keys were associated. If a number of individual users have keys to a single door and one is lost, all key holders must be contacted and provided with new keys.

As well, passwords or keypad numbers can be inadvertently or deliberately revealed, thereby lessening security and usually resulting in a need to re-program the lock to accept a new code. Then, when code locks must be re-programmed, all authorized users must be informed of the new code and they must, therefore remember yet another code.

Also, keeping track of who has keys to which doors can be an issue and this becomes more complex, as in many business situations, the more doors and employees there are.

Further, if individuals are permitted to access some parts of a facility but not others, Then a multiplicity of keys is required, adding to the problem of key management for both business and individual. And temporary access to premises by, for example, cleaning staff or neighbours, is difficult to control and monitor and, thus, reduces security.

Access to premises in emergency or potential emergency situations, such as by fire departments in the event of a fire alarm, usually requires forced entry if normally-authorized persons are not available to unlock doors, thereby causing structural damage and consequent repair expenses.

Most businesses and many homes make use of monitored alarm systems in addition to door locks, requiring individual users both to carry keys for the premises and to remember alarm codes.

Access control systems exist that solve some of the problems by means of wired connections to the doors for which access is being controlled. Some of these systems can communicate between locations via wide area networks. Generally, such systems require special software and computer systems on or near the premises being protected. Often dedicated monitoring equipment and stations are required. These systems are costly to install and operate and are oriented towards larger organizations. These systems also do not extend to controlling access to locations where wired connections are impractical.

A number of other locking and access control systems have been devised. For example, it is known to employ wireless communication between a secure door and remote site in order to obtain authorization. While these systems are successful in solving some of the problems mentioned above, they are usually too costly or require too much technical support to be of use to private residences or small businesses. In addition, none of the technologies employed thus far address the problems of the individual user who must deal with a large number of keys and/or codes.

Accordingly, there is a need to provide an improved system and method for physical access control, in which most of the above conventional problems and disadvantages can be solved.

SUMMARY OF THE INVENTION

According to one aspect of the present invention, there is provided a system for door access control and key management. The system includes: (1) a door administering system for administering access to one or more doors, the door administering system having: (a) a module for managing access privilege of one or more individuals for each door and assigning access authorization to each individual for the door, (b) a door database for storing a door identification uniquely assigned to each door and information on each authorized individual for each door, and (c) a module for changing data stored in the door database; (2) a key administering system for administering one or more keys separately from the administration of the access to the door, each key being uniquely assigned to a key owner, the key administering system having: (d) a key database for storing one or more keys for each key owner, and (e) a module for changing data stored in the key database, (3) a door control/lock assembly mounted on each door, the door control/lock assembly, the door administering system and the key administering system communicating with each other through a communications network, the door control/lock assembly for identifying a user key when it is presented by a user, and for operating the door based on access privilege of the user when the identified key of the user is the key of a key owner who is an authorized individual having access authorization to the door.

According to a further aspect of the present invention, there is provided a method of implementing door access control and key management via a communications network. The method includes: steps of: (1) at a door server, administering access to one or more doors, including: (a) managing access privilege of one or more individuals for each door and assigning access authorization to each individual for the door; and (b) at a door database, storing a door identification uniquely assigned to each door and information on each authorized individual for each door, data stored in the door database being updatable; (2) at a key server, administering one or more keys separately from the administration of the access to the door, each key being uniquely assigned to a key owner, including: (c) at a key database, storing one or more keys for each key owner, the keys being implemented by key signatures, data stored in the key database being updatable; (3) at a door control/lock assembly, identifying a user key presented by a user; (4) comparing the identified key to the keys of the key owners and verifying that the identified key is a key of a key owner who is an authorized in individual having access authorization to the door; (5) operating the door based on the access privilege of the individual, wherein the authorization step is carried out through the communications network between the door server and the key server.

According to a further aspect of the present invention, there is provided a system architecture for controlling door access and key management. The system architecture includes: (a) a plurality of door access control and key management systems noted above, the systems being communicatively and operatively connected to a communication network; and (b) a Meta server being adapted to serve as an address reference among the door administering system and the key management system, which are separately part of each door access control and key management system, the Meta server being communicatively and operatively connected to each of the door access control and key management systems via the communications network, wherein the Meta server contains the address of each separate door administering system and key administering system each with its associated unique key ID codes and unique door ID codes, and each door access control and key management system contains the address of the Meta server such that any key owner, whose keys are administered by any key administrating system, can be granted access privileges at any door which is administered by any door administering system.

Other aspects and advantages of the invention, as well as the structure and operation of various embodiments of the invention, will become apparent to those ordinarily skilled in the art upon review of the following description of the invention in conjunction with the accompanying drawings.

BRIEF DESCRIPTION OF THE DRAWINGS

Embodiments of the invention will be described with reference to the accompanying drawings, wherein.

DETAILED DESCRIPTION OF THE PREFERRED EMBODIMENTS

Figure 1:
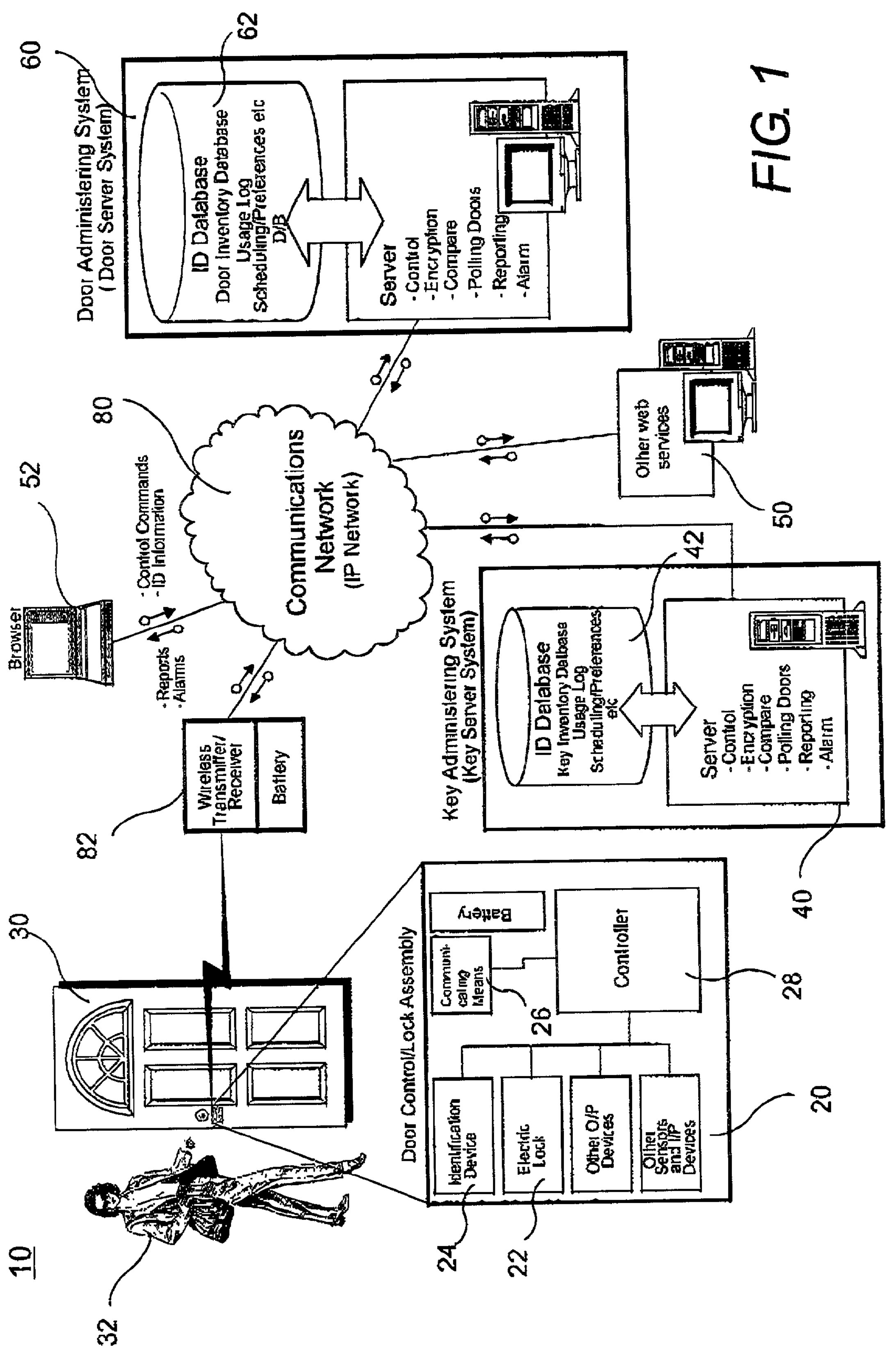
FIG. 1 illustrates a door access control and key management system with a door administering system and a key administering system according to one embodiment of the present invention.

In FIG. 1 there is shown a door access control and key management system according to the first embodiment of the present invention, which is generally denoted by reference numeral 10, and involves a plurality of doors and door users although a single door and user are illustrated for the convenience of description and understanding. Throughout the description and claims, the door includes all kinds of doors for access thereto to be controlled, including building entrance doors or interior doors, private house doors, vehicle doors, and safe doors, or all kinds of locks for other devices such as bicycles, padlocks. However, this invention is not limited to the doors and locks noted above.

Referring to FIG. 1, the system generally comprises a door control/lock assembly 20, a key administering system 40, a door administering system 60, and a communications network 80. The door control/lock assembly 20 is mounted on each door and communicatively connected to the key and door administering systems 40 and 60 via the communications network 80. In practice, the door administering system 60 and the key administering system 40 can be implemented as one single system equipped with the appropriate software program for carrying out both functions for the convenience of people who are door administrators, who control doors and the access thereto, and who also have keys authorized for access for the doors that they administer or for doors to which access is controlled by other door administrators. In general, the door control/lock assembly 20 identifies a user 32 wanting to gain access to a door 30, and communicate with the key and door administering systems 40 and 60 to obtain authorization for access thereto.

In this embodiment, the communications network 80 includes an IP (Internet Protocol) communications network, which is accessible by the door control/lock assembly 20 via an HTTPS (Hyper Text Transport Protocol Secure) server. In such an Internet communication environment, the key administering system 40 and the door administering system 60 can be referred to as a key server system and a door server system as shown in FIG. 1. However, the communications network can employ any suitable network protocol.

All communication lines connecting the components of the system 10 employ encryption means for improved security.

The connection between the communications network 80 and the door control/lock assembly 20 can be accomplished via a wireless communication line. In such a case, an intermediate wireless transmitter/receiver 82 between them is provided as illustrated in FIG. 1. The means of wireless communication includes Bluetooth® or other short-range wireless communications circuitry, or a network access module consisting of Bluetooth® wireless communications circuitry, an Ethernet network interface and a battery backed up power supply. The network access module is located at an Ethernet port within the range of the Bluetooth® or other short-range wireless communications circuitry.

Alternatively, the means of wireless communication can include digital cellular wireless Internet access circuitry to provide greater range or for use where an Ethernet networks port is not convenient or available.

The system 10 further includes several other elements, which will be hereafter described.

Figure 2:
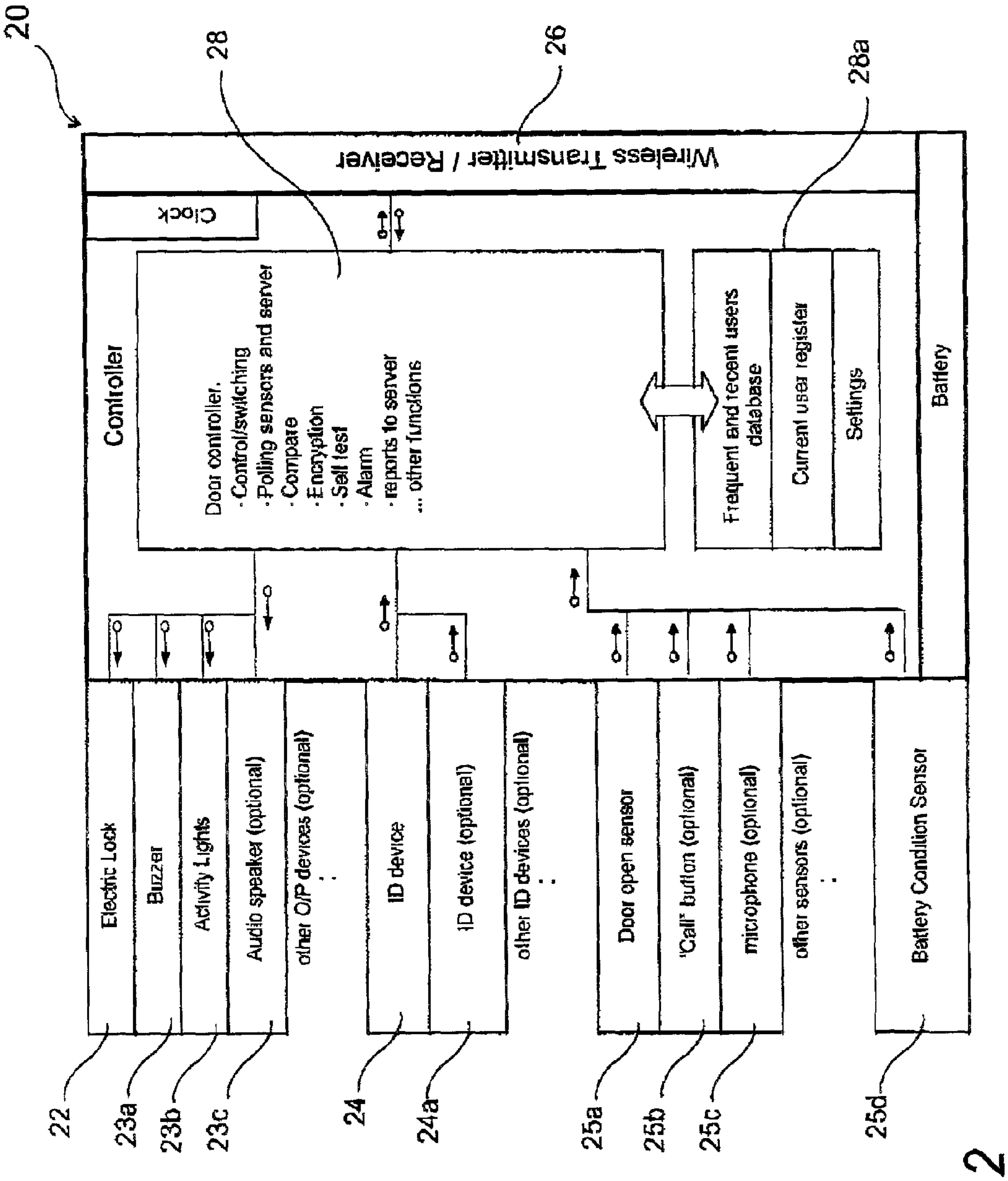
FIG. 2 illustrates the details of the door control/lock assembly of FIG. 1.

FIG. 2 presents a detailed view of the door control/lock assembly 20 of the system 10. As illustrated in FIGS. 1 and 2, the door control/lock assembly 20 mounted on each door 30 includes an electric door lock 22, an identification device 24, an embedded controller 28, a communicating means 26, and a battery for supplying power. The communicating means 26 establishes two-way communications with the communication network 80 via a wireless transmitter/receiver 82. The embedded controller 28 has appropriate software for controlling the door control/lock assembly 20 and any communications with other system components via the communications network 80. During operation, the door control/lock assembly 20 transmits via the communication network the identification data read by the identification device 24 to the key-door administering systems 40 and 60 and receives messages or signals from the administering systems as to whether the identified key is authorized. Details of the operation will be hereafter described.

The door lock 22 includes any lock that can operate in response to an authorization signal or message from the key and door administering system 40/60, or, in certain situations, from the embedded controller 28 of the door assembly 20.

The identification device 24 identifies the key wishing to gain access to the door. The identification device 24 can be a proximity card reader or swipe card reader or any other such device. Also, the identification device 24 can include a wireless receiver employing public key cryptography (PKI) technology or other secure communications technology to receive signals from a device carried by the user 32. In such a case, the key can be an electronic key such as a Dallas Semiconductor iButton®, a cell phone, a portable digital assistant (PDA) equipped with digital wireless capability, a personal communicator device, and an RF (Radio Frequency) tag device. For example, the tag device provides a short-range radio frequency signal that is coded to provide identification of the individual user. In addition, a biometric recognition device such as thumb-print reader or face-recognition device can be used as the identification device 24. A numeric or alphanumeric key pad device can also be used. The key includes any device that can be sensed by the identification device used. For example, where the identification device is a numeric keypad, the key can be a numeric code.

As depicted in FIG. 2, the door control/lock assembly 20 can be equipped with more than one identification devices 24 and 24*a* to improve security or convenience. In such a case, for improved security, all keys are required in order for the system 10 to grant access. Also, for improved convenience, any one key can be required to gain access, therefore, the user 32 can carry one or more of a variety of key types, which correspond to the identification devices 24, 24*a*.

In the door control/lock assembly 20, the embedded controller 28 runs appropriate software for controlling the assembly 20 and carrying out an identification/authorization process by cooperating with the identification device 24 and communicating with the door and key server systems 40 and 60 via the communications network 80. Various identification/authorization software applications are well known in the art and any suitable one can be used. The embedded controller 28 comprises a local database or a memory 28*a* as shown in FIG. 2. The local database or memory 28*a* stores, for example, data of the most recent and most frequent users of the door in encrypted form for security reasons. These data serve to speed up authorization process, or provides back-up capability in the event that the connection between the door assembly 20 and the administering systems 40 and 60 failed or is disrupted for any reason.

The embedded controller 28 in the door control/lock assembly 20 periodically conducts a self-test of its own functionality and records data from status sensors, which will be hereafter detailed.

Each door control lock assembly 20 is provided with a unique identification code that is encoded in hardware and can be recognized by software programs running in the door control/lock assembly 20 and other software programs running in the system 10 The door administering system 60 serves to store the unique identification code for each of the doors and manage these ID codes. Also, each door is assigned an authorized user or users for access to the door from the door administering system 60. The door administering system 60 includes a database 62 where the unique ID code and the authorized users for each door are maintained and updated, when required, by a door administrator.

The door control/lock assembly 20 and the door server system 60 work together to provide a number of functions. For example, the door server system 60 records all uses of the door lock 22, including authorized entries and unauthorized attempts to enter. The door server system 60 also provides the necessary controls and communications capability to allow the door administrator to configure various security settings of the operation of the door control/lock assembly 20, in addition to the basic authorization settings of which keys are allowed to unlock which doors. These security settings include such functions as to who is authorized at specific times. Other additional functions include settings as to who is to be notified in the event of an alarm of low battery condition or a detection of hardware failure condition and how such notification is to take place (e.g., e-mail, pager, automated phone call, or the like.) Such factors as the amount of lead-time to report that low battery condition can also be set.

In this embodiment, the door administering system 60 periodically polls all connected door control/lock assemblies 20 to update frequent or most recent users saved in the embedded controller 28 and receive reports from the embedded controller self-test routines. If the embedded controller 28 in the door control/lock assembly 20 does not receive a poll from the door server system 60 within a pre-set interval, it can initiate a report to the server on its own.

A single door server system can provide these functions for a number of doors controlled by the same door administrator, or multiple door servers can be used. The same door server can also provide these functions for a number of different door administrators, but each door administrator is prevented from accessing the information pertaining to doors controlled by others. Any number of door server systems can run on the system at the same time. The information recorded in each door server database concerning the authorized entrances and exits through the door and the unauthorized attempted entrances and exits may be used in several ways. Reports can be generated when required.

The key administering system or server 40 serves to store a unique key for each of the users. The unique key is implemented by a key signature. The key signatures consist of the unique codes associated with each key, i.e., each user. The key signature serves to distinguish a key from any other keys. The type of these codes depends on the identification device 22 used on the door control/lock assembly 20. As examples, the key signatures can consist of coded numbers that have been magnetically written onto a normal magnet swipe card, if a swipe card reader is used as the identification device 24. The key signatures can be the unique hardware with embedded serial numbers assigned at manufacture to iButtons® if an iButton® reader is used as the identification device. The key signatures can be a signal unique to each user, if the identification device at the door is adapted to identify the unique signal from, for example, a Bluetooth® enabled cell phone or PDA (Portable Digital Assistant) carded by the user. The key signature can be a fingerprint recognition code if the identification device at the door is a fingerprint reader. The key signatures are stored in encrypted form in the key administering system 40.

The key administering server system 40 includes a database 42 that contains information on the keys and the doors to which each key is allowed access. The key server system 40 provides a number of functions by working together with the door control/lock assembly 20. In particular, the key server system records all use of the key, including authorized entries and attempts to enter using the key that were not authorized on a door-by-door basis.

As is the situation for the door server systems and door administrators, a single key server system can provide these functions for a number of keys controlled by the same key administrator, or multiple key servers can be used. The same key server can also provide these functions for a number of different key administrators, but each key administrator is prevented from accessing the information pertaining to keys controlled by others. Any number of key server systems can run on the system at the same time.

The information recorded in the key server database 42 concerning the uses of the key to unlock various doors and any unauthorized attempted entrances and exits is used in various ways. Reports can be generated when required.

The key server system 40 can further provide the key administrator with reports of every instance of the use of the key that has been recorded anywhere on the system 10.

The key and door server databases 42 and 62 can be updated and viewed from a Web browser 52 connected to the communications network 80.

Since the door/key administering system 60/40 maintains logs of entries and exits, it is possible to access the database and determine whether anyone is in a secured area, and the identity of the person, if anyone is indeed in a particular area.

The system of FIG. 1 provides security means to control access by persons to building, rooms or vehicles, while gathering useful information. The system provides a means for one or more door administrators to allow a person access to some locations, while, at the same time, excluding access to other locations, this may be accomplished with only one access key per individual as defined in that person's key server system database 42. Such access privileges can be variable according to time. The system provides a means to change the security settings such as access privileges of an individual quickly and easily from any location where an Internet connection and browser software are available. Information gathered by the system includes the time of all attempts to access the door and the identification of the individual attempting such access (if known) or the fact that an unknown individual attempted to gain access. Furthermore, the access privileges associated with the 'key' may be easily changed as circumstances change. This allows people potential to have only one 'key' to open all of the doors in their lives while, at the same time, increasing security and convenience, since each person can be their own key administrator.

To deal with the occasional instance that the communications network 80 is not available and to speed up access for frequent users of a door, a local database 28*a* of frequent and most recent user authorized key signatures is stored in encrypted form in the door control/lock assembly 20 itself. Before sending a request message for authorization over the communications network 80 to the door server system 60, the embedded controller 28 in the door control/lock assembly 20 checks its own local database 28*a* and unlocks the door if a match is found between the signature of the key being presented and one that is stored in the local database 28*a*. The information that this action has taken place is then transmitted to the door server system 60 for storage subsequent to the door having been unlocked. Periodically the authorized keys in the local database 28*a* of the door assembly 20 are confirmed between the door assembly 20 and the door server system 60 by a series of encrypted messages over the communications network 80. This confirmation process can be initiated by the door control/lock assembly 20, or the door administering system or server 60. If a key signature that has been authorized is no longer authorized, then the key signature is removed from the local database 28*a* of the embedded controller of the door assembly 20.

Referring to FIG. 2, the door control/lock assembly 20 further includes other components to provide additional functions. Such a device can include a microphone and speaker assembly 23*c* and 25*c*. This serves to communicate with the door administering system or server 60 via the communications network 80, which then communicates with a designated door administrator 52 or other systems using e-mail, telephone or pager according to predetermined instructions stored in the door server system.

A doorbell/intercom signalling device can be provided and configured to send a message via email, pager or telephone to a designated monitoring administrator. The designated monitoring administrator can be located anywhere that an Internet connection and browser software are available.

As well, alarm devices such as motion detectors, smoke detectors, or water detectors etc. can be installed in the door control/lock assembly 20. The alarm device communicates with the door server system 60, which in turn communicates the alarm administrator according to instructions included in the database 62. Any other additional alarm components can be provided and configured to signal their condition in various ways and to monitor multiple locations that can be altered easily over time.

The door control/lock assembly 20 can further include a door open sensor 25*a* that detects whether the door is open or closed. A buzzer device 23*a* can also be included. If the door remains open for a period of time longer than a preset interval, then, the buzzer is sounded for a brief period before an alarm condition message is sent to the door administrator to deal with such alarms. If the door is closed after the sounding of the buzzer but before the sending of the alarm message, the alarm is not sent. Alternatively, the buzzer is not sounded and the alarm condition message is sent immediately. In either case, the information that the door open alarm condition was encountered is stored in the door server 60 as a reporting function. The pre-set interval for which the door may remain open before the buzzer sounds may be changed and may vary with time of day or it may be disabled for specific periods to accommodate various situations. Such changes or scheduling are accomplished by the door administrator accessing the door server system 60 via the browser 52.

Other system status sensors that may be part of the door control/lock assembly include a battery voltage sensor and a temperature sensor.

The door control/lock assembly 20 can also include a digital camera (still or video) that is configured to provide an image of the individual attempting to gain access to a person assigned to make human judgement on whether such individuals, not identified by the system should be allowed access. The judging person may then allow the individual in, if desired, by signalling the door control/lock assembly 20 from the Web browser 52. The camera may also be configured to record in the network databases, an image of all individuals attempting to gain access.

Figure 3:
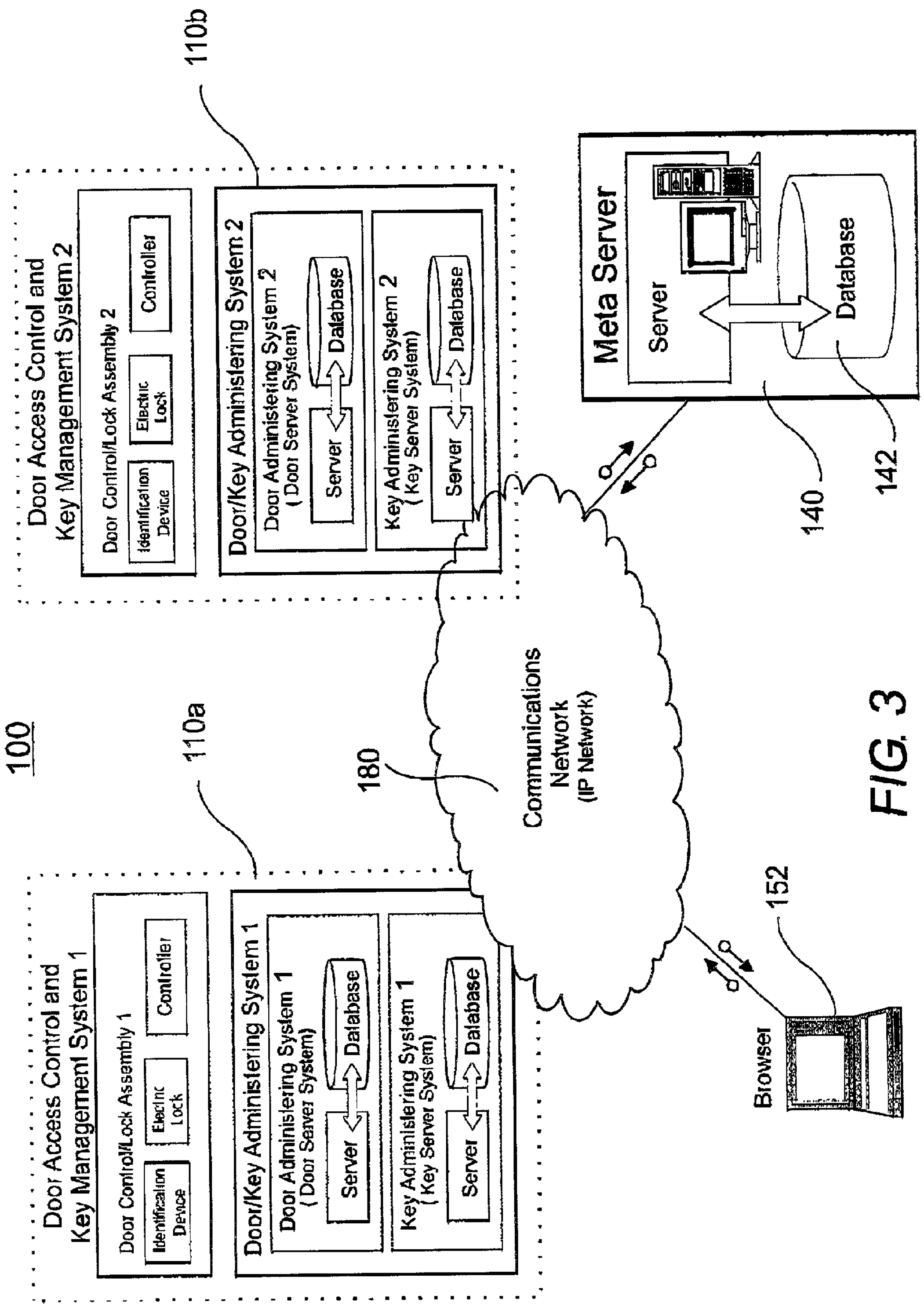
FIG. 3 illustrates a system architecture according to another embodiment of the present invention for controlling a number of door access control and key management systems of FIG. 1.

In FIG. 3, there is shown a system architecture according to the second embodiment of the invention, which is generally denoted by reference numeral 100, and can control a group of individual door access control and key management systems, for example, of the first embodiment of the invention, as shown FIG. 1. The system architecture 100, in general, comprises a plurality of door access control and key management systems 110*a* and 110*b*, a Meta server 140, and a communications network 180. The communications network 180 includes an IP (Internet Protocol) communications network. For the convenience of description and understanding, two door access control and key management systems 110*a* and 110*b* are illustrated in FIG. 2, but a number of individual systems can be involved in to be controlled within a single system architecture.

Each door access control and key management system 110*a* or 110*b* involves a plurality of doors and door users, and includes a door control/lock assembly mounted on each door, a door/key administering system comprised of a door administering system and a separate key administering system, and a communications network communicatively interconnecting the door control/lock assemblies and the administering system, as noted above in conjunction with the first embodiment of the invention of FIG. 1.

As depicted in FIG. 3, each door access control and key management system is communicatively connected to one another and the Meta server 140 via the communications network 180. The Meta server 140 is adapted to be aware of all instances of each door/key administering system and know how to contact them over the communications network 180. The Meta server 140 comprises a database 142, which contains unique ID numbers and the addresses of their associated administering systems. For example, the data base can contain a look-up table that associates each unique key ID code with the address of the corresponding key/door administering system, and also another look-up table that associates each unique door ID code with the address of the corresponding administering system.

Also, each door access control and key management system, i.e., each door/key administering system knows the location (i.e. network address) of the Meta server 140. The administering system contains the address of the Meta server 140.

The Meta server 140 is adapted to serve as an address reference, i.e., as a directory of addresses for those instances where the door/key administering system of one user needs to communicate with the door/key administering system of another user and the first system does not know the address of the second system. Therefore, the first system can locate the second system through the Meta server via the communications network.

The Meta server can be accessed by an administrator responsible to maintain it, for example, through a Web browser 152 communicatively connected to the Meta server via the communications network 180, as shown in FIG. 3. Also, the database can be updated by the administrator when required.

Therefore, the door access control and key management system 110*a* communicates with other system 110*b* via the Meta server 140 such that the system 110*a* can provide access to its own doors for a user or users from other system 110*b* and whose unique key ID numbers are stored on the other system.

The Meta server 140 may be mirrored in a number of locations, in which case each Meta server is updated regularly so that all Meta servers can remain in the same state, for example, contain the same data.

When a door/key administering system has a new key ID number or door ID number added to it, the door/key administering system updates the information in the meta server database so that other door/key administering systems can communicate with the new key or door.

Other additional features and advantages according to the present invention are described below:

The door/key administering system has all of the unique ID codes of all of the doors and keys, and is aware of which door provides access for which key or keys. Thus, if a key ID code is required to be changed or deleted, its associated door/key administering system sends messages to all of the other door/key administering systems so that they can update their own relevant data. If a key is lost or stolen, its ID code is quickly and easily removed from all of the systems and then, the lost or stolen 'key' may not be used by unauthorized persons. Attempts by someone to use the lost or stolen 'key' can be reported to, for example, the key server or the door server and such information may be useful in locating the missing key and the unauthorized key holder.

A special case exists for use in hotels, where the system of the invention allows the potential for hotel guests to avoid registering at the front desk. Instead, they can proceed directly to their rooms where 'registration' occurs as they are recognized at the hotel room door via their pre-arranged access identification or 'key'. The network databases can be connected to the hotel guest reservation and registration system.

Also, the system of the invention permits line-ups at hotel check ins or car rental agencies to be avoided while ensuring security for both the patron and the hotel or car rental agency. As well, keys not returned to hotels or car rental agencies are an expense and a potential security problem. The system removes both the expense and the security threat. Further, in a hotel with this system installed, hotel staffs have the means to know if someone is in a room without disturbing the occupant. The need for 'do not disturb' signs is eliminated and hotel guests will be disturbed much less frequently.

Fire Departments and other emergency crews can be allowed easy access to a building in emergency situations if door administrators authorize the use of a Fire department key. Emergency workers can also be allowed access to information on the door server which allows them to determine with much greater certainty whether anyone is actually in a burning building.

Many home owners with pets can configure a residential door to be operable by the pets themselves such to allow the pets access to and from the house while still providing security against access by other animals or by human intruders. A key can be assigned to allow the pet to use a pet door at will while keeping it locked to others. Times of operation can be set by the pet owner via a Web browser. Via the browser, as well, the pet owner can be informed as to whether the pet is in or out, how may times the pet has gone in/out etc. An example of such a key is an RF tag device. These tags provide a short-range radio frequency signal that is coded such that the animal (and possibly its owner) can be identified by reference to a registry of such tags. The tag may either be implanted or mounted in a pet collar.

If a 'key' is lost or stolen it can be quickly and easily replaced for all its uses with no chance that the lost or stolen 'key' may be used by unauthorized persons. The replacement is effected by the key administrator accessing the key database via a browser and deleting or deactivating the unique key ID number associated with the lost or stolen key, and adding a new unique key ID number associated with a replacement key. This new key is then propagated to the access control databases. Attempts by someone to use the lost or stolen 'key' can be reported to the key server database owned by the rightful key owner and such information may be useful in locating the missing key and possibly in apprehending the thief.

When an employee is terminated or quits a position, keys, which are not a returned to the employer, are an expense and a potential security threat. This system removes both the expense and threat.

No special user software is required. The required software systems run within the doors for which access is being controlled and on servers that may be run by third party service providers.

Information logs on use of the physical access control system is recorded remotely from the door over the communications network.

There is no physical limit to the number of individuals that can be granted access to any door on the system.

The system allows the possibility for individuals to have one key that can be used for multiple situations, including their residences, various work situations, vehicles or any other places to which they may need access on a regular or occasional basis. These access privileges can be altered or scheduled easily and quickly to apply to specific times or to adapt to changing circumstances. Such changing circumstances may include moving to a new house, acquiring vacation property, changing jobs, acquiring a new vehicle, renting a vehicle, renting a hotel room, temporarily accessing the house of a friend or neighbour, or losing a 'key'. In the case of a lost or stolen 'key' (where biometric identification systems are not being used) the old key can be cancelled for all of its uses and a new 'key' can be authorized quickly and easily from any place where an Internet connection and browser software are available. Each individual can act as the door administrator for doors under their control, such as those in their house or car, and can act as their own key administrator, such that door administrators for, say, their place of work, their friends or relatives, can grant them access to doors for which these other door administrators administer access privileges.

While the invention has been described according to what are presently considered to be the most practical and preferred embodiments, it must be understood that the invention is not limited to the disclosed embodiments. Those ordinarily skilled in the art will understand that various modifications and equivalent structures and functions may be made without departing from the spirit and scope of the invention as defined in the claims. Therefore, the invention as defined in the claims must be accorded the broadest possible interpretation so as to encompass all such modifications and equivalent structures and functions.

What is claimed is:

1. A system for door access control and key management, the system comprising:

(1) a door administering system for administering access to one or more doors, the door administering system having:

(a) a module for managing access privilege of one or more individuals for each door and assigning access authorization to each individual for the door, (b) a door database for storing a door identification uniquely assigned to each door and information on each authorized individual for each door, and (c) a module for changing data stored in the door database;

(2) a key administering system for administering one or more keys separately from the administration of the access to the door, each key being uniquely assigned to a key owner, the key administering system having:

(d) a module for managing the one or more keys and assigning a key to the key owner independently from the access privilege for each door, (e) a key database for storing one or more keys for each key owner, and (f) a module for changing data stored in the key database, (3) a door control/lock assembly mounted on each door, the door control/lock assembly, the door administering system and the key administering system communicating with each other through a communications network, the door control/lock assembly for identifying a user key presented by a key user, and for operating the door based on the access privilege of the key user when the identified user key is a key administered by the key administering system, and the key user is an individual authorized to any of the one or more doors by the door administering system and having access authorization to the door.

2. The system as claimed in claim 1, wherein the door control/lock assembly carries out the authorization process when the communication between the door control/lock assembly and the door and key administering systems is interrupted.

3. The system as claimed in claim 1, wherein the communications network includes a wireless communications network.

4. The system as claimed in claim 1, wherein the communications network includes an IP (Internet Protocol) communications network, and the door administering system and the key administering system include a door administering server system and a key administering server system, respectively.

5. The system as claimed in claim 1, wherein the key of the key owner includes a key signature unique to the respective key owner, which is not unique to the door and is recognizable by the door control/lock assembly.

6. The system as claimed in claimed in claim 1, wherein the communication and authorization process between the door and key administering systems and the door control/lock assembly are carried out in a form of encrypted signals or messages.

7. The system as claimed in claim 1, wherein each door control/lock assembly includes;

an identification device for reading the user key presented by the key user;

a lock adapted to be operated in response to the authorization from the door and key administering systems; and an embedded controller for controlling the operation of the identification device and the lock, and the authorization process.

8. The system as claimed in claim 1, wherein the door administering system is physically separated from the key administering system.

9. The system as claimed in claim 1, wherein the stored data pertaining to the doors can be updated when required by a door administrator and the stored data pertaining to the keys can be updated when required by a key administrator.

10. The system as claimed in claim 1, wherein the door control/lock assembly, and the door administering system and key administering system are adapted to be controlled by a web browser operatively connected to the communications network.

11. A system architecture for controlling door access and key management, the system architecture comprising:

(a) a plurality of door access control and key management systems, each of which is the system for door access control and key management according to claim 1, the systems being communicatively and operatively connected to a communication network; and (b) a Meta server being adapted to serve as an address reference among the door administering systems and the key administering systems, which are separately part of each door access control and key management system, the Meta server being communicatively and operatively connected to each of the door access control and key management systems via the communications network, wherein the Meta server contains the address of each separate door administering system and key administering system each with its associated unique key Ip codes and unique door Ip codes, and each door access control and key management system contains the address of the Meta server such that any key owner, whose keys are administered by any key administering system, can be granted access privileges at any door which is administered by any door administering system.

12. The system as claimed in claim 1, wherein the key owner of a key is capable of changing the key of that key owner at the key database.

13. The system as claimed in claim 1, wherein the door is assigned to one or more door administrators, the door administrator being capable of changing information stored at the door database and associated with the assigned doors.

14. The system as claimed in claim 1, wherein the door administering system is administered by one or more door administrators, and the key administering system is administered by one or more key administrators.

15. The system as claimed in claim 1, wherein the door control/lock assembly sends the identified key to the key administering system, the door administering system or a combination thereof to obtain access authorization.

16. The system as claimed in claim 1, wherein the door administering system assigns, to each door, the key uniquely assigned to each key owner who is an individual having access authorization to the door.

17. The system as claimed in claim 1, wherein the door administering system records authorized entries to the doors and unauthorized attempts to unlock the door.

18. The system as claimed in claim 1, wherein the key database records use of the keys, including authorized access to the door and unauthorized attempt to unlock the door.

19. The system as claimed in claim 1, wherein the door administering system and/or the key administering system maintains logs of entries and exits of each user through the door.

20. The system as claimed in claim 1, wherein the system gathers information which includes (i) time of attempts to access a door, (ii) an identification of a user who attempted the access, and (iii) information on attempts to gain access to the door by an unknown individual.

21. The system as claimed in claim 3, wherein the door control/lock assembly further includes a wireless transmitter/receiver.

22. The system as claimed in claim 4, wherein the door control/lock assembly and the door and key administering systems are adapted to be controlled via a web browser operatively connected to the IP communications network.

23. The system as claimed in claim 5, wherein the key signature includes a numeric code, a sequence of numbers, a unique signal, or a biometric recognition code.

24. The system as claimed in claim 7, wherein each key owner has one or more keys for the door, and the door control/lock assembly includes two or more identification devices which are different from each other.

25. The system as claimed in claim 7, wherein the door control/lock assembly further includes a module for assisting in the operation of the door control/lock assembly and sensing the status of the door, the assisting and sensing module including one or more of the following: a door open sensor, a speaker and microphone assembly, a camera, an activity light, a buzzer, a call button, a battery condition sensor, a smoke sensor, a temperature sensor.

26. The system as claimed in claim 7, wherein the embedded controller includes a database for storing information on the keys and users such that, when the communication between the door control/lock assembly and the door and key administering systems is interrupted, the door control/lock assembly can carry out the authorization process for the door associated therewith.

27. The system architecture as claimed in claim 11, wherein the communications network includes an IP communications network.

28. The system architecture as claimed in claim 11, wherein the Meta server is adapted to be controlled via a web browser communicatively and operatively connected to the Meta server through the communications network.

29. The system architecture as claimed in claim 11, wherein more than one Meta server is provided to the door access control and key management systems.

30. The system as claimed in claim 13, wherein the door administering system allows the door administrator to configure a plurality of security settings for the operation of the door control/lock assembly.

31. The system as claimed in claim 14, wherein the access given to a particular key to a particular door is communicated to the key administrator for that particular key and/or the door administrator by the door control/lock assembly.

32. The system as claimed in claim 16, wherein the identified key is compared with the key or keys of the key owners who are the individuals having access authorization to the door for the verification.

33. The system as claimed in claim 18, wherein the key administering system is controlled by one or more key administrators and the key administering system provides the key administrator with a report of every instance of the use of the key that has been recorded.

34. The system as claimed in claim 19, wherein based on the logs, it is determined who is in a specific area through the door.

35. The system as claimed in claim 24, wherein the key owner is authorized for access to the door by using all or several of the keys.

36. The system as claimed in claim 30, wherein the security settings include a setting specifying who is authorized at specific times to the door.

37. The system as claimed in claim 30, wherein the security setting includes access privileges of each user, which is changeable by the door administrator.

38. The system as claimed in claim 30, wherein the door control/lock assembly has an alarm device, which communicates with the door administering system, the door administering system communicating with an alarm administrator in accordance with the security setting.

39. The system as claimed in claim 36, wherein the security settings include a setting specifying who is to be notified in an event of an alarm and how the alarm is notified.

40. A method of implementing door access control and key management via a communications network, the method comprising steps of:

(1) at a door server, administering access to one or more doors, including:

(a) managing access privilege of one or more individuals for each door and assigning access authorization to each individual for the door; and (b) at a door database, storing a door identification uniquely assigned to each door and information on each authorized individual for each door, data stored in the door database being updatable;

(2) at a key server, administering one or more keys separately from the administration of the access to the door, each key being uniquely assigned to a key owner, including:

(c) managing the one or more keys and assigning a key to the key owner independently from the access privilege for each door;

(d) at a key database, storing one or more keys for each key owner, the keys being implemented by key signatures, data stored in the key database being updatable;

(3) at a door control/lock assembly, identifying a user key presented by a key user;

(4) comparing the identified user key to the keys of the key owners; and (5) operating the door based on the access privilege of the key user by verifying that the identified user key is a key administered by the key server and the key user is an individual authorized to any of the one or more doors by the door server and having access authorization to the door, wherein the authorization step is carried out through the communications network between the door server and the key server.

41. The method as claimed in claim 40, further comprising a step of storing two or more different unique key signatures for the user whereby all of the different key signatures are required to gain access to the door.

42. The method as claimed in claim 40, wherein the communications networks includes an IP communications network.

43. The method as claimed in claim 40, wherein the communications networks includes a wireless communications network.

44. The method as claimed in claim 40, wherein the assigning step assigns access authorization to an individual having a key stored in the key database.

45. The method as claimed in claim 41, wherein any one of the different key signatures is required to gain access to the door.

* * * * *

UNITED STATES PATENT AND TRADEMARK OFFICE

CERTIFICATE OF CORRECTION

PATENT NO. : 7,170,998 B2

APPLICATION NO. : 10/004340

DATED : January 30, 2007

INVENTOR(S) : Gavin A. McLintock and D. Michael Caughey

It is certified that error appears in the above-identified patent and that said Letters Patent is hereby corrected as shown below:

On the title page, (75) Inventors, please delete “Michael D. Caughey” and insert therefor --D. Michael Caughey--.

Column 13, line 16, after “key”, please delete “Ip” and insert therefor --ID--.

Column 13, line 16, after “door”, please delete “Ip” and insert therefor --ID--.

Signed and Sealed this

Ninth Day of October, 2007

JON W. DUDAS

*Director of the United States Patent and Trademark Office*